United States Patent
Wells et al.

(10) Patent No.: US 8,291,765 B2
(45) Date of Patent: Oct. 23, 2012

(54) CARRIER MODULATING ACCELEROMETER

(75) Inventors: Michael L. Wells, Hawthorne, CA (US); Thomas E. Jenkins, Los Angeles, CA (US); Carl P. Chaplin, Playa Del Ray, CA (US); Hongthu K. Nguyen, West Covina, CA (US)

(73) Assignee: Raytheon Company, Waltham, MA (US)

( * ) Notice: Subject to any disclaimer, the term of this patent is extended or adjusted under 35 U.S.C. 154(b) by 721 days.

(21) Appl. No.: 12/435,098

(22) Filed: May 4, 2009

(65) Prior Publication Data

US 2010/0275688 A1  Nov. 4, 2010

(51) Int. Cl.
*G01P 15/125* (2006.01)

(52) U.S. Cl. .................................... 73/514.32

(58) Field of Classification Search .................. None
See application file for complete search history.

(56) References Cited

U.S. PATENT DOCUMENTS

| | | | |
|---|---|---|---|
| 2,949,780 A | | 8/1960 | Williams |
| 3,219,971 A | * | 11/1965 | Cole ............................. 367/42 |
| 3,698,508 A | * | 10/1972 | Landrum, Jr. ................ 367/190 |
| 3,722,293 A | * | 3/1973 | Morris ....................... 73/514.35 |
| 3,829,659 A | * | 8/1974 | Margolis ....................... 235/411 |
| 4,068,210 A | * | 1/1978 | Corkhill ........................ 367/190 |
| 4,236,407 A | * | 12/1980 | Alpini et al. ............... 73/115.06 |
| 5,481,914 A | * | 1/1996 | Ward ........................... 73/504.16 |
| 5,600,064 A | * | 2/1997 | Ward ........................... 73/504.04 |
| 5,703,292 A | * | 12/1997 | Ward ........................... 73/504.02 |
| 6,230,562 B1 | * | 5/2001 | Ishikawa et al. ............ 73/504.02 |
| 7,178,397 B2 | * | 2/2007 | Lee et al. .................... 73/504.12 |
| 7,513,140 B2 | * | 4/2009 | Kato .............................. 73/1.37 |
| 7,683,601 B2 | * | 3/2010 | Bouyat ......................... 324/71.1 |
| 7,765,869 B2 | * | 8/2010 | Sung et al. .................. 73/504.04 |
| 2008/0306706 A1 | * | 12/2008 | Markovic ....................... 702/141 |
| 2008/0315935 A1 | * | 12/2008 | Bouyat ........................... 327/306 |
| 2010/0083754 A1 | * | 4/2010 | Mijuskovic et al. ........ 73/504.12 |

FOREIGN PATENT DOCUMENTS

| | | |
|---|---|---|
| EP | 0347034 A2 | 12/1989 |
| EP | 0350153 A2 | 1/1990 |
| JP | 2004-030199 | 1/2004 |
| JP | 2006-170628 | 6/2006 |

OTHER PUBLICATIONS

Analog Devices Inernally Trimmed Precision IC Multiplier AD534 Data Sheet.* Analog Devices Small and Thin +/−2 g Accelerometer ADXL322 Data Sheet.*

(Continued)

*Primary Examiner* — Hezron E Williams
*Assistant Examiner* — Mark A Shabman
(74) *Attorney, Agent, or Firm* — Christie, Parker & Hale, LLP

(57) ABSTRACT

An accelerometer module for measuring acceleration in a stabilized platform system includes a power supply configured to accept an input AC reference signal and to generate a regulated DC signal and a reference signal in phase with the input AC reference signal; an accelerometer configured to receive the regulated DC signal from said power supply and to generate an output signal in response to an external force acting on the accelerometer module and an analog multiplier unit configured to receive the output signal from the accelerometer and the reference signal from the power supply, and to modulate the reference signal with the output signal so as to output a modulated accelerometer signal. A method for servicing a stabilized platform system comprising is also provided.

19 Claims, 6 Drawing Sheets

OTHER PUBLICATIONS

"Internally Trimmed Precision IC Multiplier" AD534—Rev. B, Analog Devices, Analog Devices, Inc., Norwood, MA, 1999, pp. 1-12.
"Small and Thin ±2 g Accelerometer" ADXL322—Rev. 0, Analog Devices, Analog Devices, Inc., Norwood, MA, 2005, pp. 1-16.
Intl. Preliminary Report on Patentability dated Nov. 16, 2011 of PCT/US2010/024183 filed Feb. 12, 2010 (9 pages).
Japan Office action for Japan Application No. 2011-512756, filed Feb. 12, 2010, Japan Office action mailed Jul. 3, 2012 (2 pgs.).
English translation of Japan Office action for Japan Application No. 2011-512756, filed Feb. 12, 2010, Japan Office action mailed Jul. 3, 2012 (3 pgs.).

* cited by examiner

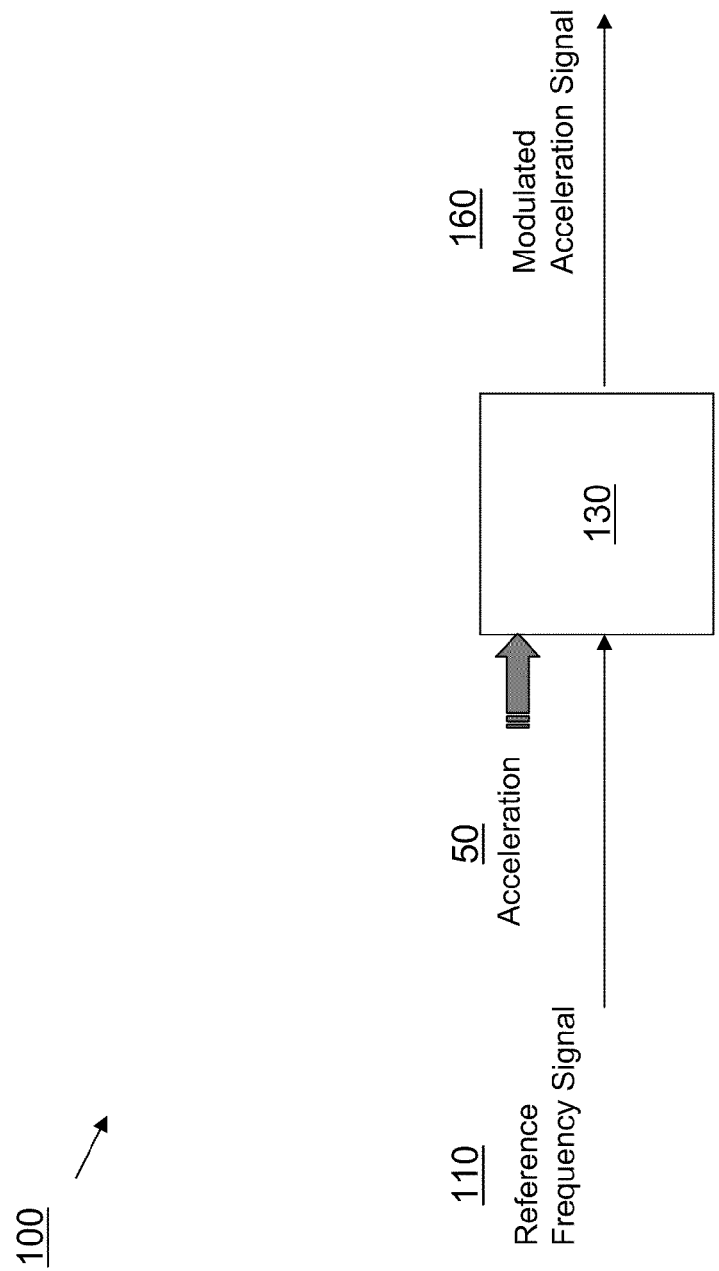
Figure 1 (Conventional)

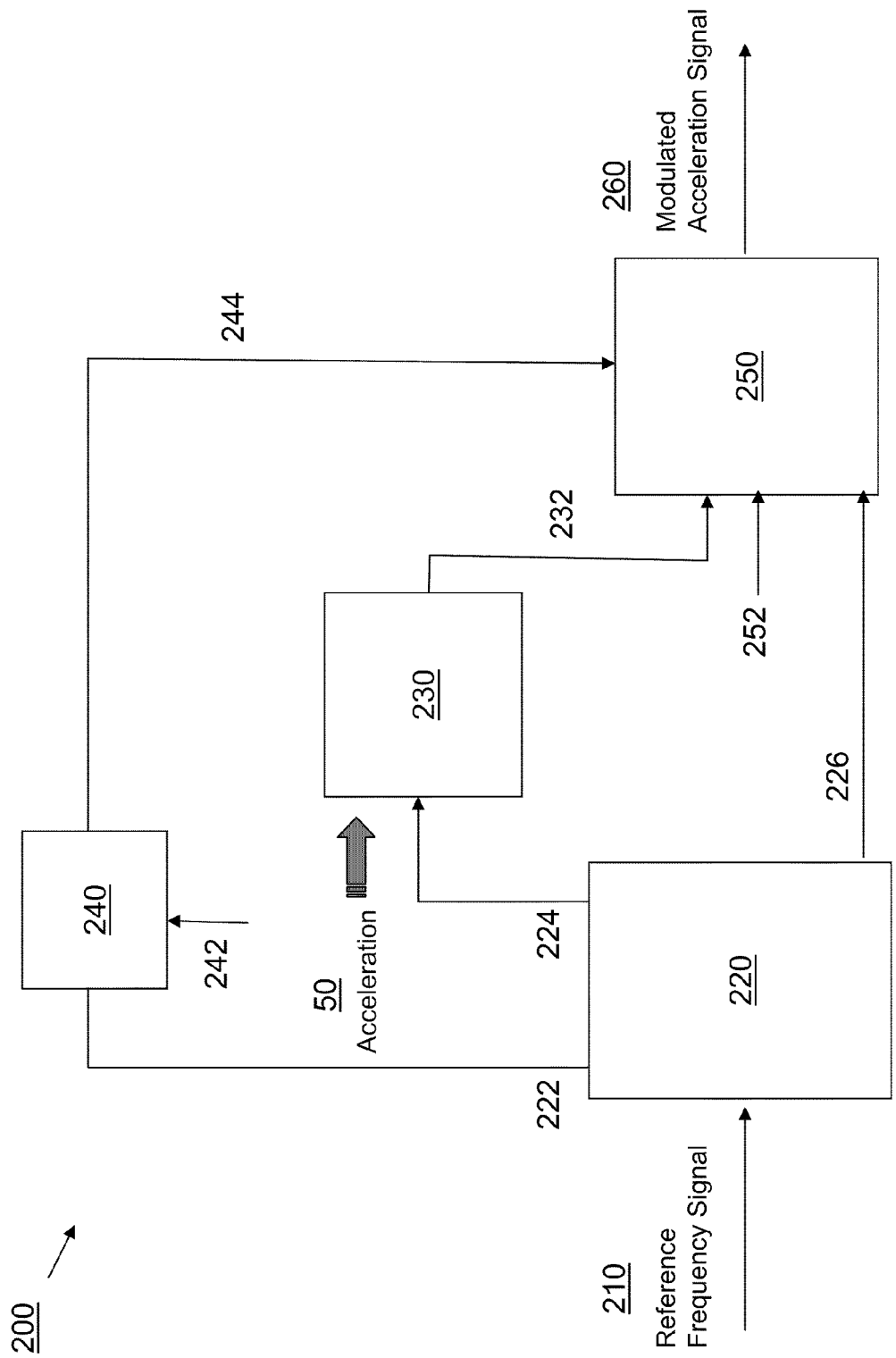

CARRIER MODULATING ACCELEROMETER

BACKGROUND

This application generally relates measuring forces on a body, and in particular, an accelerometer used to measure forces in a stabilized platform system.

The Raytheon Company M-65 Airborne Tube-launched Optically-tracked Wire-to-command-link ("TOW") system and the Kollsman Inc. Night Targeting System (similar to the M-65 system) use a pair of accelerometers to sense aircraft movement and assist the operator in tracking targets. These stabilized platform systems may be incorporated in vehicles and aircraft, such as the AH-1W USMC or other AH-I1 Cobra Attack Helicopter. It is estimated that there are at least 400 of these systems (or variants thereof) in use worldwide.

The TOW airborne system uses an accelerometer for each axis of its stabilized sight to sense aircraft movement with respect to the line of sight. This is used to correct the line-of-sight position for aircraft motion in order to maximize the probability of hit of the system. The conventional accelerometer module used in these system may utilize to Honeywell International Inc. Part No. 258970 (or equivalent), which interfaces with a mount to become an accelerometer module (e.g., Raytheon Part Nos. 3439031 or 3439030), or equivalents thereof. Two accelerometer modules may be provided, one for measuring acceleration in each of the elevation and azimuth directions.

Conventionally, the accelerometer modules outputs are integrated using electronics and this output is used to move the operator's line-of-sight to maintain the crosshair on a missile target, by correcting or compensating for the movement of the aircraft. The accelerometer modules are connected a 20 VAC, 900 Hz signal and provide a phase referenced AC signal for the motion compensating system. A similar system is disclosed, for example, in U.S. Pat. No. 3,829,659, incorporated herein by reference in its entirety.

FIG. 1 shows a block diagram of conventional accelerometer module 100 used for measuring acceleration in a stabilized platform system. Reference signal 110 is input to mechanical accelerometer 130. Typically, reference signal 110 is a 20 VAC, 900 Hz signal. In response to acceleration 50 applied to accelerator 130, accelerometer 130 generates an amplitude-modulated signal 160 which is provided to the avionics of the stabilized platform system for further processing.

Problems with conventional accelerometer modules 100 are that they are constructed using a mechanical strain gauge type accelerometer 130, which are very fragile and easily damaged due to severe shock and procuring original equipment manufacturer (OEM) replacement accelerometers may be very difficult and costly, particularly for systems with relatively long service lives.

SUMMARY

According to an embodiment, an accelerometer module for measuring acceleration of a stabilized platform system includes: a power supply configured to accept an input AC reference signal and to generate a regulated DC signal and a reference signal in phase with the input AC reference signal; an internal accelerometer component configured to receive the regulated DC signal from said power supply and to generate an output signal in response to an external force acting on the accelerometer module; and an analog multiplier configured to receive the output signal from the accelerometer component and the reference signal from the power supply, and to modulate the reference signal with the output signal so as to output a modulated accelerometer signal.

According to another aspect, a system for measuring acceleration in a stabilized platform includes: two of the above-described accelerometer modules for measuring acceleration in each of two reference directions of the stabilized platform system. The two reference directions may correspond to the elevation and azimuth axes.

According to another embodiment, a method of servicing a stabilized platform system includes: removing an existing accelerometer module from the stabilized platform; and installing the above-described accelerometer module in the stabilized platform using existing procedures.

Other features and advantages of one or more embodiments of the present application will seem apparent from the following detailed description, and accompanying drawings, and the appended claims.

BRIEF DESCRIPTION OF THE DRAWINGS

Embodiments of the present application will now be disclosed, by way of example only, with reference to the accompanying schematic drawings in which corresponding reference symbols indicate corresponding parts, in which:

FIG. 1 shows a block diagram of the conventional accelerometer module used for measuring acceleration in a stabilized platform system;

FIG. 2 shows an exemplary schematic for an accelerometer unit, in accordance with an embodiment, where

DETAILED DESCRIPTION

Figure 2A:
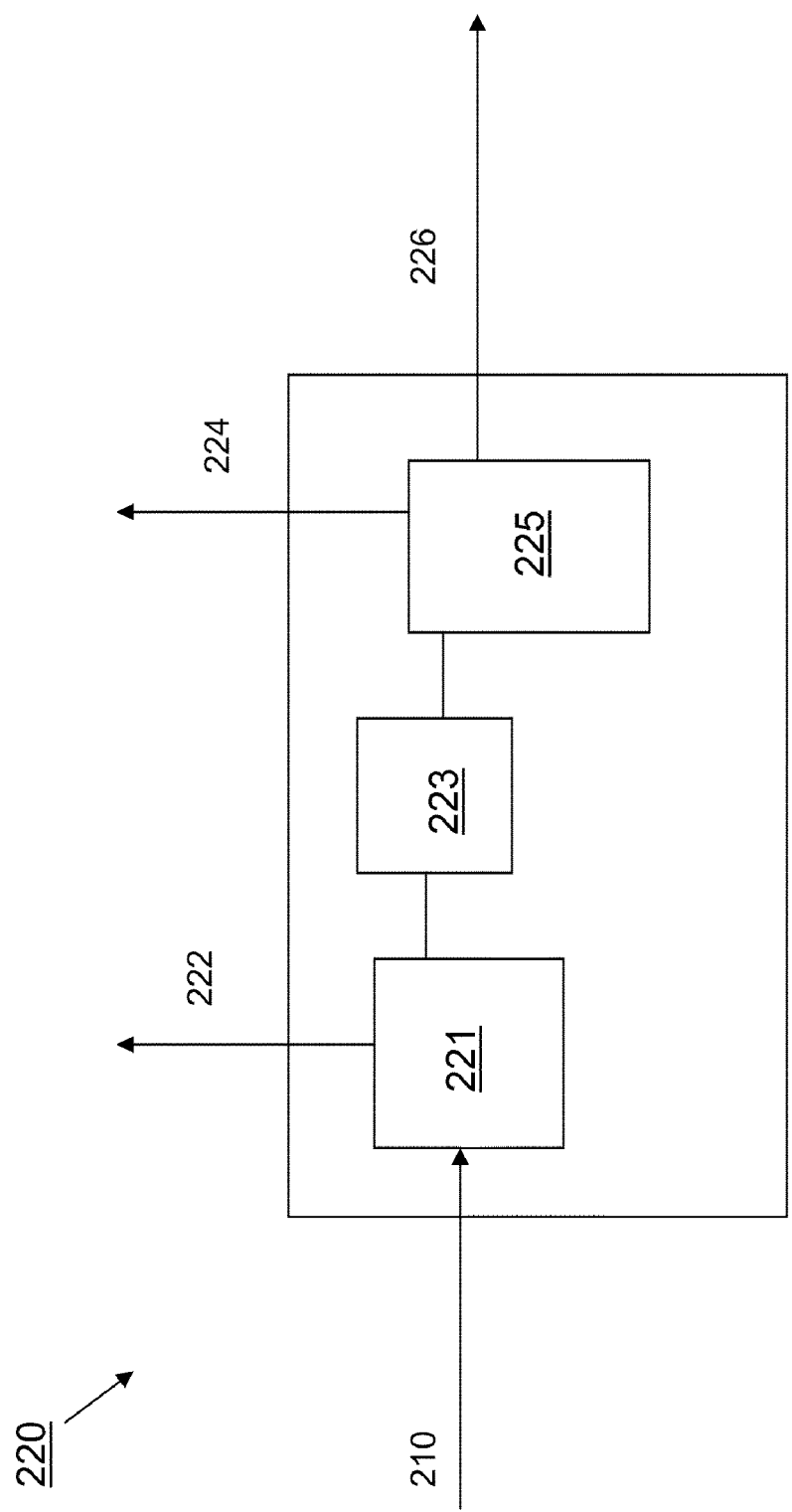
FIG. 2A shows one exemplary embodiment of the power supply shown in FIG. 2.

FIG. 2 shows an exemplary schematic for accelerometer module 200, in accordance with an embodiment. Accelerometer module 200 may be configured for use in a stabilized platform system.

In one exemplary embodiment, accelerometer module 200 generally includes power supply 220, accelerometer 220, and analog multiplier unit 250. The various components may be mounted, for example, on a printed circuit board.

Power supply 220 is configured to provide well-regulated power for accelerometer 230 as well as power for the analog multiplier unit 350. In one implementation, input power signal 210 supplied to power supply 220 may be 20 VAC, 900 Hz.

Power supply 220 is configured to generate three power signals from input power signal 210. In particular, power supply 220 provides reference signal 222, which is substantially in phase with the input power form 210. In some implementations, input power signal 210 may be the same as input reference signal 110 (FIG. 1). In addition, power supply 220 supplies a DC output signals 224, 226, respectively to both accelerometer 230 and analog multiplier unit 250.

FIG. 2A shows one exemplary embodiment of power supply 220 shown in FIG. 2. Power supply 220 may include transformer 221 configured to step down input power signal 210, rectifier 223 configured to covert the stepped-down AC voltage to DC voltage, and power regulator 225 configured to provide a regulated DC voltage.

In one implementation, transformer 221 may provide reference signal 222. For example, transformer 221 may have one or more secondary coils including a designated secondary coil which provides reference signal 222 from input power signal 210. It will be appreciated that other devices could also be used to provide reference signal 222, such as, for example, an optically coupled isolator (not shown). Ideally, reference signal 222 will have little to no phase shift from input power signal 210.

Providing regulated DC power to accelerometer component 230 and modulator 250 insures that the accuracy requirements will be met. For example, power supply 220 may be configured to supply regulated 5 VDC and 12 VDC power from 224, 226 respectively. Rectifier 223 may be a single-phase full wave bridge rectifier. Power regulator 225 may be an integrated circuit (IC), such as, for example, Model No. LT3010/LT3010-5 micropower linear regulator manufactured by Linear Technology. Other voltage outputs may similarly be provided, as desired.

With reference to FIG. 2, in some implementations, attenuator 240 may also be provided for enabling adjustment of gain of reference signal 244 supplied to the modulator. For example, attenuator 240 may include a trimmer 242, such as a potentiometer, variable resistor, rheostat, or the like, to adjust the gain.

Accelerometer 230 may be a solid-state accelerometer or differential capacitance accelerometer which provides or whose output can provide a time-varying DC signal 232 in response to acceleration 50 applied to the accelerometer module. Unlike conventional strain-gauge and other mechanical type accelerometers 130 (FIG. 1), accelerometer 230 is much more robust. In one implementation, accelerometer 230 may be a Model ADXL322 accelerometer manufactured by Analog Devices, Inc. This accelerometer, in particular, is very rugged and has been rated to survive 10,000 Gs. Further, the accelerometer module embodiment provides addition of level control and gain adjustment for precise alignment. An integrator may also be provided that is configured to provide a low-pass filter for the accelerometer component time-varying DC signal 232.

Analog multiplier unit 250 may include an analog 4-quadrant multiplier chip to modulate reference signal 244 with time-varying DC signal 232 output from accelerometer 230. In one implementation, multiplier 250 may be a Model AD534 internally trimmed integrated circuit (IC) multiplier manufactured by Analog Devices, Inc. The accelerometer module may have an operational response of approximately 0-10 Hz.

In one implementation, analog multiplier unit 250 generates amplitude modulation (AM) using a carrier wave having the same frequency as input signal 210. For example, modulated acceleration signal 260 may have a phase and amplitude, where the phase indicates acceleration polarity and the amplitude (of the envelope) indicates the acceleration magnitude. Other modulation algorithms, such as frequency or phase modulation could also be used. Modulated acceleration signal 260 may be adjusted, via trimming device 252, to bias the output of the modulator (e.g., 0 G bias). Trimming device 252 may be a potentiometer, trimmer, variable resistor, rheostat, or the like.

The modulated acceleration signal 260 may conform to the form, fit, and function of existing electronic hardware and in the stabilized platform system. Downstream in such systems, phase-sensitive de-modulation (and further modulation) of the modulated signal occurs. See, for example, U.S. Pat. No. 3,829,659, mentioned above.

For a 900 Hz input signal 210, reference signals 222, 244 will be approximately 900 Hz. While 900 Hz AC voltage is disclosed, it will be appreciated that other military or avionics power forms might also be used, such as, for example, 400 Hz AC. Thus, any mention of 900 Hz or 400 Hz AC voltage is not to be construed as limiting.

Figure 3:
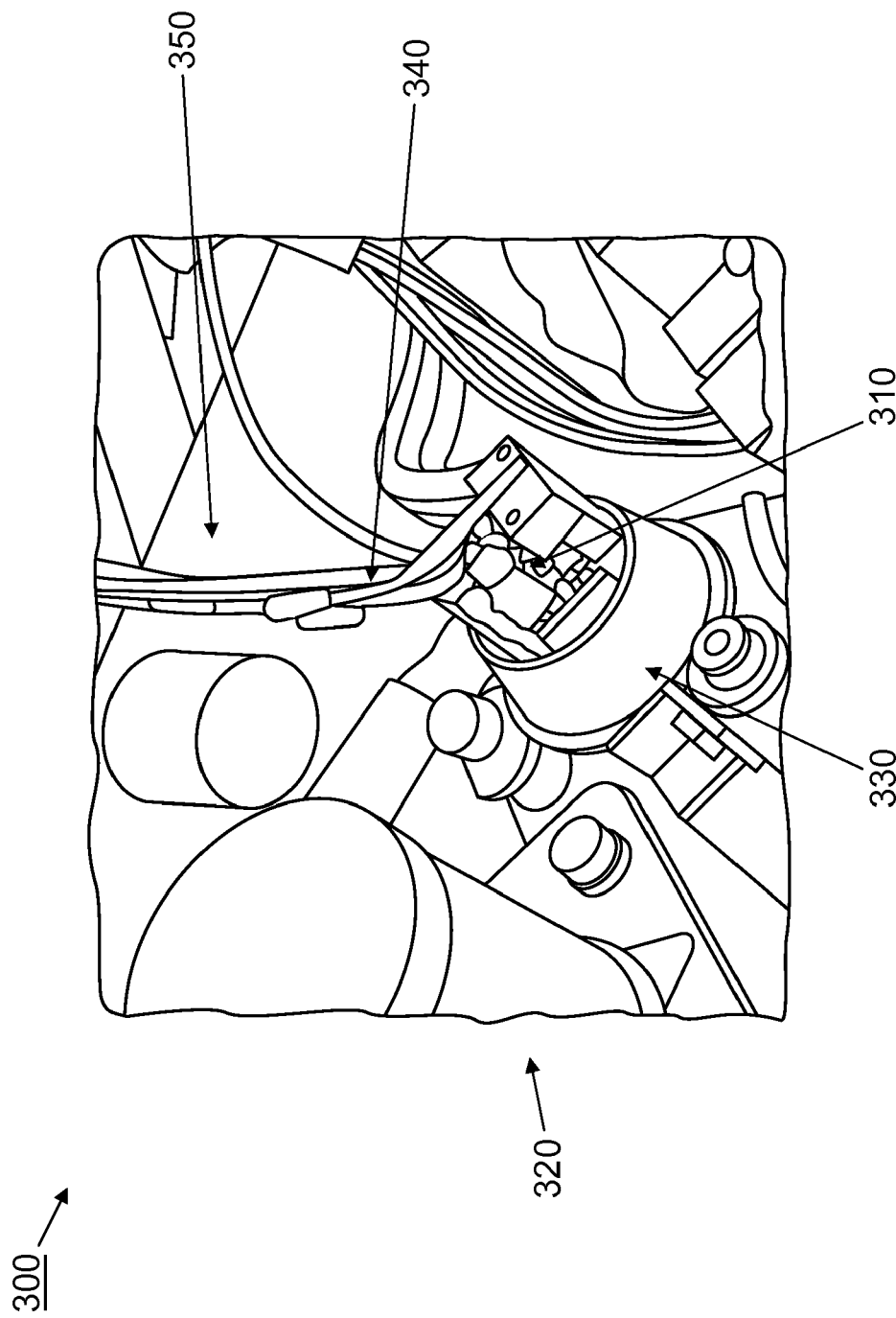
FIG. 3 shows an exemplary system including an accelerometer module installed in a stabilized platform system, in accordance with an embodiment.

FIG. 3 shows an exemplary system 300 including an accelerometer module 310 installed in a stabilized platform system 320, in accordance with an embodiment.

Stabilized platform system 320 may be a M-65 Telescopic sight unit or similar unit which utilizes a 20 VAC 900 Hz signal as the power source, as well as the reference for the amplitude modulated output. Accelerometer component 310 may be formed on a printed circuit board, which is installed into housing 330. To secure accelerometer component 310 into housing 330, a suitable potting or encapsulating compound may be utilized. In one implementation, accelerometer 310 may be configured to couple to the existing housing in the stabilized platform.

As shown in FIG. 3, housing 330 may be configured to be mounted on balanced gimbals in stabilized platform system 320. In one embodiment, housing 330 may be a cylindrical can or box, for example, constructed from aluminum or lightweight alloys so as to reduce weight. Plastics could also be used. Housing 330 may provide an interface with the existing stabilized platform system.

Accelerometer module 310 may be adapted for use with the existing hardware. Accordingly, accelerometer module 310 provides a form, fit and function replacement to the conventional accelerometer unit module using a Honeywell International Inc. Part No. 258970 or a substantially equivalent device manufactured and/or distributed by another company.

In one implementation, input signals 210 and modulated acceleration signal 260 (FIG. 2) may be transmitted using the existing connector cables used with the conventional accelerator unit. There may be one or more plug-in connections. For example, input power signal 210 may be supplied by connector 340. Modulated acceleration signal 260 may be output from the accelerometer module 310 via connector 350. Connectors 340, 350 may be pin-type connectors, as known in the art. As such, modulated acceleration signal 260 may appear substantially similar to modulated output signal 160 (FIG. 1) to the stabilized platform system.

Two or three accelerometer modules 310 may be installed for measuring acceleration in each of elevation and azimuth (or a x, y, z coordinate frame) on stabilized platforms, such as, for example, Raytheon Part Nos. 3234001-110, -134, or a substantially equivalent device manufactured and/or distributed by another company. In one implementation, two accelerometer modules 310 having different keyed pin-type connectors, one for elevation and one for azimuth, may be provided. Other indicia may be used for identifying the two. As such, service personnel may distinguish between the two, although the inner working of each of accelerometer units 310 may otherwise be similar.

Figure 4B:
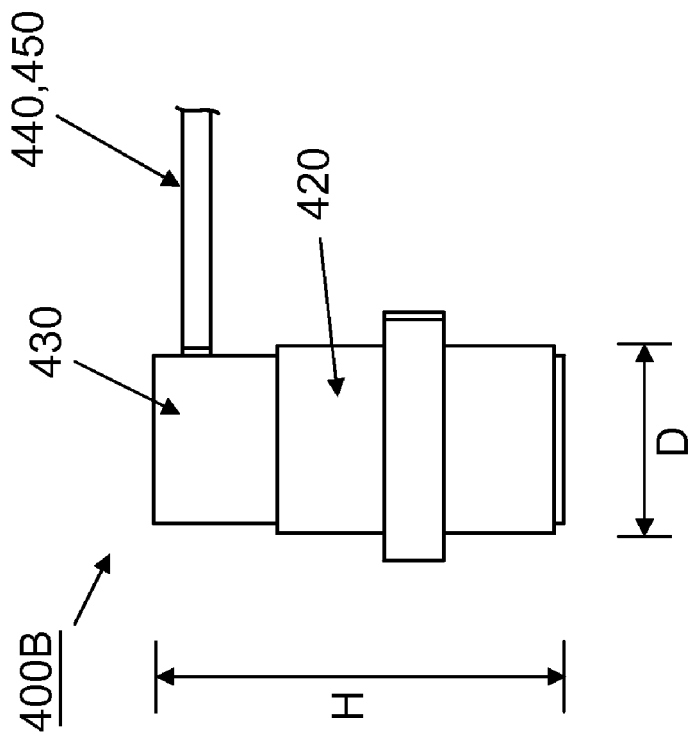
FIGS. 4(a) and (b) show an accelerometer module, in accordance with an embodiment.
Figure 4A:
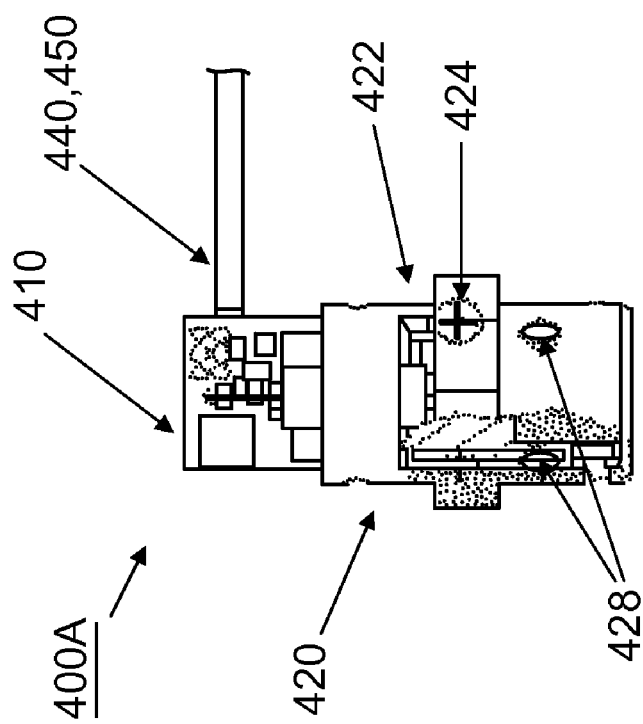

FIG. 4(*a*) and (*b*) show an accelerometer module, in accordance with an embodiment. FIG. 4(*a*) shows a cut-away view of accelerometer module 400A before encapsulation. In one embodiment, the various elements, including the accelerometer component, may be assembled on printed circuit board 410 which is installed in housing 420. Connectors 440, 450 may be attached to printed circuit board 410.

Housing 420 may be generally cylindrical having central recessed portion 422. For example, housing 20 may be a CNC machined block of metal, although, steel has been found to provide a good weight match with existing hardware requirements.

The printed circuit board 410 is inserted into recessed portion 422 (a portion thereof is shown "cut-away" in the figure). Once the printed circuit board 410 is inserted into recessed portion 422, there may be a mechanical adjustment procedure in which the accelerometer component is aligned with the reference axes of housing 420. Alignment holes 428 may be provided at various locations on housing 420 to facilitate alignment using an alignment fixture (not shown).

After alignment, the printed circuit board 410 may be secured to the housing 420 via fasteners 424. Fasteners 424 may be screws, although it will be appreciated that other fastening elements and/or methods could also be used. Potting material 430 may then be molded or otherwise formed over the exposed portion of the printed circuit board 410 to encapsulate the printed circuit board 410 within the housing.

FIG. 4(b) shows encapsulated accelerometer module 400B before installation. In one embodiment, encapsulated accelerometer module 400B may have a nominal diameter D of approximately 1.5-1.6 inches and a height H of about 0.6-0.7 inch.

Figure 5:
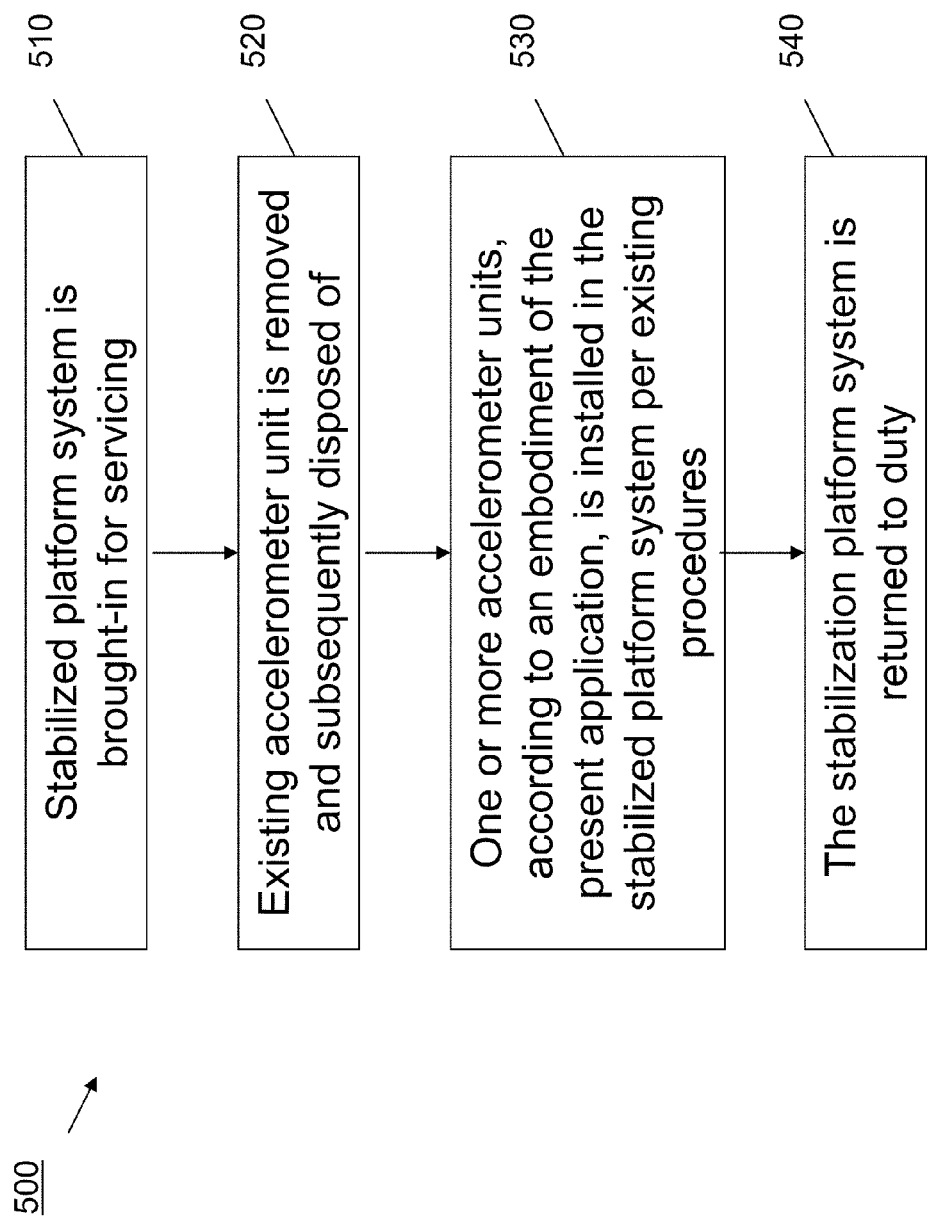
FIG. 5 shows an exemplary method for servicing a stabilized platform, in accordance with an embodiment.

FIG. 5 shows an exemplary method 500 for servicing a stabilized platform, in accordance with an embodiment.

Beginning in step 510, a stabilized platform system may be returned for servicing. For example, the stabilized platform system may be a Raytheon Company M-65 Airborne TOW system or the Kollsman Inc. Night Targeting System. As noted above, these systems may be incorporated in an aircraft, such as the AH-1W USMC Cobra or other type of Attack Helicopter. Other systems which utilized accelerometer units may similarly be serviced or refurbished.

One or more service centers may be provided, which include specialized equipment and personnel for serving these systems. The services centers may be located on military bases, government installation, and/or on premises that are owned or operated by defense contractors. Moreover, these service centers may provide other services and repairs for the vehicles or aircraft which utilize the stabilized platform systems.

In step 520, the existing accelerometer unit is removed and subsequently disposed of. As will be appreciated, various fasteners, power and/or output cables, connectors, wire-harnesses, etc. may need to be released and/or removed to provide access to the accelerometer unit. Typically these system uses a strain-gauge and other mechanical type accelerometers, such as, for example, Raytheon Part Nos. 32349031 or 3439030, or equivalents thereof. As noted above, the stabilized platform system may include two such accelerometers, one for measuring acceleration in each of the elevation and azimuth directions. The removed accelerometer units may be discarded or dismantled for recycling the components thereof.

Next, in step 530, one or more accelerometer units, according to an embodiment of the present application, is installed in the stabilized platform system. The accelerometer unit may be configured to couple to an existing mount such as the Raytheon Part Nos. 32349031 or 3439030, or equivalents thereof. This may require reassembling the various fasteners, cables, connectors, wire-harnesses, etc. to retain the accelerometer unit. The input power and output cables may be coupled with the acceleration unit. In one implementation, the accelerometer unit may have different keyed pin connectors, one for elevation and one for azimuth.

Finally, in step 540, the stabilized platform system is returned to duty. Other systems which utilized accelerometer units may similarly be serviced or refurbished.

Accordingly, the proposed accelerometer module provides a form, fit and functional replacement to the conventionally known and potentially obsolete accelerometers used in currently fielded stabilized platform systems.

While this disclosure has been described in connection with what is presently considered to be the most practical embodiments, it is to be understood that it is capable of further modifications and is not to be limited to the disclosed embodiments, and this application is intended to cover any variations, uses, equivalent arrangements or adaptations of the disclosure following, in general, the principles of the disclosure and including such departures from the present disclosure as come within known or customary practice in the art to which the application pertains, and as may be applied to the essential features hereinbefore set forth and followed in the spirit and scope of the appended claims.

What is claimed is:

1. An accelerometer module for measuring acceleration in a stabilized platform system comprising:
    a power supply configured to accept an input AC reference signal and to generate a regulated DC signal and a reference signal in phase with the input AC reference signal;
    an accelerometer configured to receive the regulated DC signal from said power supply and to generate an output signal in response to an external force acting on the accelerometer module; and
    an analog multiplier unit configured to receive the output signal from the accelerometer and the reference signal from the power supply, and to modulate the reference signal with the output signal so as to output a modulated accelerometer signal.

2. The accelerometer module according to claim 1, wherein the accelerometer comprises a solid state or differential capacitance accelerometer.

3. The accelerometer module according to claim 1, wherein the output of the accelerometer comprises a time-varying DC signal.

4. The accelerometer module according to claim 1, wherein the analog multiple comprises an analog 4-quadrant multiplier.

5. The accelerometer module according to claim 1, wherein the power supply is configured to accept a 900 Hz input signal.

6. The accelerometer module according to claim 5, wherein the 900 Hz input signal comprises 20 VAC.

7. The accelerometer module according to claim 1, further comprising a voltage offset applied to the multiplier so as to adjust the modulated accelerometer signal.

8. The accelerometer module according to claim 1, further comprising:
    a housing configured to mount the power supply; the accelerometer; and the analog multiplier,
    wherein the accelerometer is aligned with reference axes of the housing.

9. The accelerometer module according to claim 1, further comprising an attenuator to adjust the amplitude of the reference signal that is supplied to the analog multiplier unit.

10. The accelerometer module according to claim 1, further comprising an integrator configured to filter the output of the accelerometer.

11. The accelerometer module according to claim 1, wherein the regulated DC signal comprises one or both of 5 or 12 VDC.

12. The accelerometer module according to claim 1, wherein the analog multiplier unit is configured to generate an amplitude modulated (AM) accelerometer signal.

13. The accelerometer module according to claim 1, wherein the power supply comprises a transformer having a secondary winding configured to generate the reference signal.

14. The accelerometer module according to claim 1, wherein the power supply comprises an optically coupled linear isolator configured to generate the reference signal.

15. A system for measuring acceleration in a stabilized platform comprising:
two accelerometer units, according to claim 1, for measuring acceleration in each of two reference directions of the stabilized platform system.

16. The system according to claim 15, wherein the two reference directions correspond to the elevation and azimuth gimbal axes.

17. The system according to claim 15, wherein the accelerometer modules have different keyed pin connectors.

18. A method of servicing a stabilized platform system comprising:
removing an existing accelerometer module from the stabilized platform system; and
installing the accelerometer module of claim 1 in the stabilized platform system.

19. The method according to claim 18, further comprising:
providing one or more service centers for providing service or repairs for the stabilized platform system.

* * * * *